United States Patent [19]

Foster

[11] Patent Number: 4,525,195
[45] Date of Patent: Jun. 25, 1985

[54] TAKE-OUT MECHANISM FOR A GLASSWARE FORMING MACHINE

[75] Inventor: Thomas V. Foster, Cantley, England

[73] Assignee: Emhart Industries, Inc., Farmington, Conn.

[21] Appl. No.: 433,125

[22] PCT Filed: Feb. 22, 1982

[86] PCT No.: PCT/GB82/00046
§ 371 Date: Sep. 30, 1982
§ 102(e) Date: Sep. 30, 1982

[87] PCT Pub. No.: WO82/02887
PCT Pub. Date: Sep. 2, 1982

[30] Foreign Application Priority Data

Feb. 27, 1981 [GB] United Kingdom ............... 8106256

[51] Int. Cl.³ .............................................. C03B 35/04
[52] U.S. Cl. ..................................... 65/260; 414/733; 414/736; 65/239
[58] Field of Search ................ 65/260, 239, 241, 361; 92/85 B, 85 R, 13.1; 414/733, 736, 739

[56] References Cited

U.S. PATENT DOCUMENTS

| 899,795 | 9/1908 | Osmer | 92/85 B |
| 2,783,591 | 3/1957 | Johnson | 65/260 |
| 2,826,176 | 3/1958 | Chellis et al. | 92/85 R |
| 3,150,562 | 9/1964 | Allgeyer | 91/26 |
| 3,220,566 | 11/1965 | Rowe | 65/260 |
| 4,043,254 | 8/1977 | Jaeger | 65/361 |
| 4,098,597 | 7/1978 | Nebelung | 65/234 |
| 4,298,373 | 11/1981 | Mumford et al. | 65/260 |
| 4,351,663 | 9/1982 | Wood | 65/260 |

FOREIGN PATENT DOCUMENTS 290890  5/1969  U.S.S.R. ............................... 65/260

Primary Examiner—S. Leon Bashore
Assistant Examiner—Michael K. Boyer
Attorney, Agent, or Firm—Arthur B. Moore

[57] ABSTRACT

The take-out mechanism comprises a tong carrier (2) movable in an arcuate path between a position at which tongs (4) carried by the carrier can grip an article and a second position at which the tongs release the article on to a dead plate of the machine. A piston and cylinder assembly (58, 60) provides cushioning means operable to oppose the movement of the carrier (2) as it approaches its second position to thereby reduce any impact between the articles and the dead plate.

4 Claims, 1 Drawing Figure

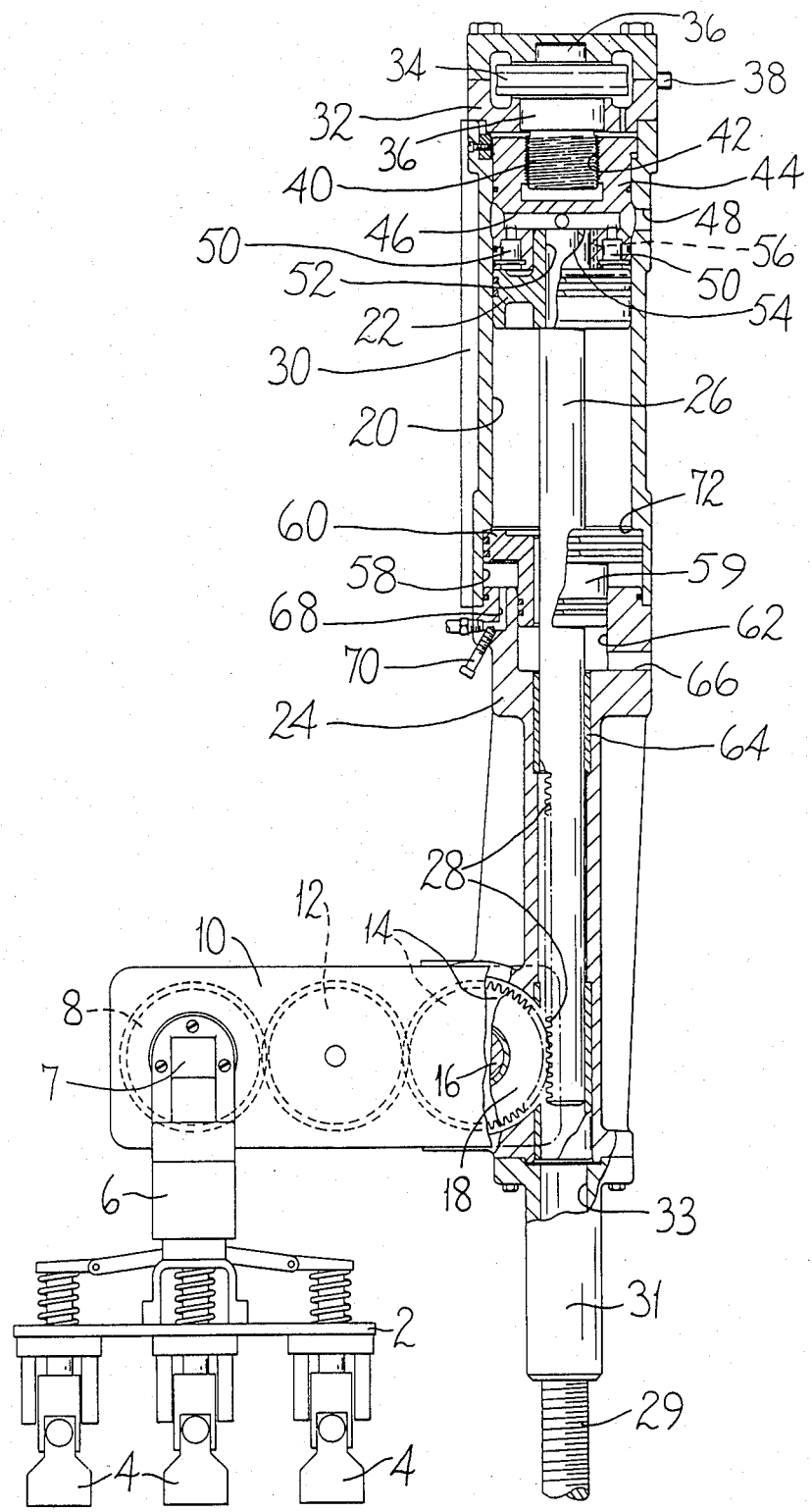

TAKE-OUT MECHANISM FOR A GLASSWARE FORMING MACHINE

TECHNICAL FIELD

This invention is concerned with a take-out mechanism for a glassware forming machine comprising a tong carrier movable in an arcuate path between a first position at which tongs supported by the carrier can grip an article of glassware and a second position at which the tongs can release the article on to a support, an arm on which the tong carrier is mounted, moving means operable to move the arm arcuately to move the tong carrier along the arcuate path, and cushioning means operable to oppose the action of the moving means as the tong carrier approaches the second position to thereby reduce the impact between an article of glassware gripped by the tongs carried by the tong carrier and the support.

BACKGROUND ART

In glassware forming machines, articles of glassware are blow moulded at a blow moulding station of the machine and then require to be removed from the moulds and positioned on a support, known as a dead plate, before being transferred to a conveyor for removal from the machine. In order to remove the articles of glassware from the moulds and position them on the dead plate, a glassware forming machine has a take-out mechanism which supports tongs which grip an article of glassware in the mould and release it on to the dead plate. In the interests of high productivity, it is necessary that the take-out mechanism operates as rapidly as possible. However, it is also necessary that the tongs do not damage the article of glassware particularly by too high an impact between the articles and the dead plate. Accordingly, take-out mechanisms have cushioning means for cushioning their movement as the articles of glassware approach the dead plate. Existing cushioning means, however, requires time-consuming adjustment to enable it to operate over a long period of time. For example, one known hydraulic cushioning means becomes inefficient due to leakage and decay in the properties of the hydraulic oil.

It is an object of the present invention to provide a take-out mechanism for a glassware forming machine which comprises cushioning means which functions efficiently without requiring adjustment for long periods of time.

DISCLOSURE OF INVENTION

According to the invention the cushioning means of the take-out mechanism comprises a pneumatic piston and cylinder assembly whose piston is arranged to be moved in the cylinder by the action of the moving means as the tong carrier approaches its second position, the movement of the piston in the cylinder being opposed by air under pressure in the cylinder.

Once the take-out mechanism has released the articles of glassware on to the support, it is desirable that the tong carrier move away from the articles of glassware as rapidly as possible, in order to allow the articles to be removed from the support. In order to achieve rapid movement of the tong carrier away from the support, preferably in a take-out mechanism according to the invention the piston and cylinder assembly of the cushioning means is operative to move the tong carrier away from its second position when the article has been released on to the support.

In order to simplify the operation of the cushioning means of a take-out mechanism according to the invention, a substantially constant air pressure is maintained in the cylinder of the piston and cylinder assembly of the cushioning means, this constant air pressure serving to oppose the movement of the piston in the cylinder as aforesaid.

BRIEF DESCRIPTION OF THE DRAWING

The drawing is a side elevational view, partly in section, of a take-out mechanism in accordance with the invention.

BEST MODE OF CARRYING OUT THE INVENTION

The take-out mechanism shown in the drawing comprises a tong carrier in the form of a bar 2 on which three pairs of tongs 4 are supported. Each pair of tongs 4 can grip an article of glassware so that the tong carrier may simultaneously carry three articles of glassware. The tong carrier 2 is fixedly mounted on a cylinder 6 of a piston and cylinder assembly which operates the tongs 4. The cylinder 6 is fixedly mounted on a shaft 7 on which a gear 8 is fixed. The shaft 7 is rotatably mounted on an arm 10. The gear 8 meshes with a further gear 12 rotatably mounted on the arm 10 and the gear 12 meshes with another gear 14 which is fixed on a shaft 16 about which the arm 10 is rotatable. The arrangement is such that, when the arm 10 on which the tong carrier 2 is mounted is rotated about the shaft 16, the gears 14, 12 and 8 act to maintain the carrier in a horizontal condition. Thus, as the arm 10 moves about the shaft 16, the articles of glassware supported by the tongs 4 will remain side by side in horizontal alginment with one another. A gear 18 which is rotatable about the shaft 16 is fixed to the arm 10 so that rotation of the gear 18 by moving means of the mechanism (to be described) moves the arm arcuately about the shaft 16. This is arcuate movement is effective to move the tong carrier 2 in an arcuate path between a first position (shown in the drawing) at which the tongs 4 supported by the carrier 2 can grip an article of glassware and a second position at which the tongs 4 can release the articles on to a support. The mechanism is positioned in a glassware forming machine so that the first position of the carrier 2 is so located that the tongs 4 can grip articles of glassware in a mould and the second position is so located that the tongs 4 can release the articles of glassware on to the dead plate of the machine. In the drawing, the carrier 2 is shown in its first position and will reach its second position by rotation of the arm 10 through approximately 180° in a clockwise direction.

The moving means of the mechanism is operable to move the arm 10 arcuately and comprises a piston and cylinder assembly having a cylinder 20 and a piston 22. The cylinder 20 is mounted on top of a support 24 on which the shaft 16 is fixedly mounted. A piston rod 26 of the piston 22 extends downwardly through the support 24 and has a rack 28 formed thereon which meshes with the gear 18. The arrangement is such that, when air under pressure is introduced into the cylinder 20 above the piston 22, the piston rod moves downwards so that the rack 28 causes the gear 18 to rotate (clockwise in the drawing) so the arm 10 is rotated clockwise about the shaft 16. When air under pressure is introduced into the cylinder 10 beneath the piston 22, the piston rod 26 moves upwards and the rack 28 causes the gear 18 to rotate in the opposite direction. The cylinder 20 has two elongated external projections 30 formed thereon (one shown in the drawing). The projections 30 are received into a slideway (not shown) of the glassware forming machine so that the position of the mechanism can be adjusted vertically relative to the machine by means of a screw-threaded portion 29 of a member 31 mounted on the bottom of the support 24. The rack 28 is received into a bore 33 in the member 31. The portion 29 is received in a threaded portion of the glassware forming machine (not shown) which supports the mechanism in its slideway so that the height of the mechanism can be adjusted by rotation of the threaded portion of the machine.

A housing 32 is mounted on top of the cylinder 20 and contains a gear 34 which is fixed on a vertical shaft 36 which is rotatable about a vertical axis on bearings contained within the housing 32. The gear 34 is rotatable within the housing 32 by means of a worm 38 which meshes with the gear 34. A lower portion 40 of the shaft 36 is screw-threaded and is threadedly received within a threaded recess 42 in an end cap 44 of the cylinder 20 which is slideable relative to the cylinder 20. The position of the end cap 44 determines the upper position reached by the piston 22 within the cylinder 20 and the position of the end cap 44 can be adjusted by rotation of the worm 38 which rotates the shaft 36 and thereby moves the end cap 44 up or down a threaded portion 40 of the shaft 36. The end cap 44 can thus be adjusted longitudinally of the cylinder 20 and this adjustment adjusts the first position of the tong carrier 2.

The end cap 44 contains an air passage 46 which communicates at all positions of the end cap 44 with a passage 48 through the wall of the cylinder 20. The air passage 46 communicates with the interior of the cylinder 20 above the piston 22 through two one-way valves 50 and also communicates with a recess 52 in the end cap 44 which opens into the cylinder 20. When air under pressure is introduced into the passage 48, the air passes through the one-way valves 50 into the cylinder 20 and drives the piston 22 downwards thereby moving the tong carrier 2 from its first position towards its second position. When the piston 22 moves upwardly in the cylinder 22, a boss 54 on the top of the piston 22 enters the recess 52 as the tong carrier 2 approaches its first position. The boss 54 is a close fit in the recess 52 and therefore prevents air from leaving the cylinder 22 through the recess 52. In this case, the air leaves the cylinder 22 through a small bleed hole 56 which passes through the end cap 54 from the cylinder 22 to the air passage 46. This arrangement provides cushioning means operable to oppose the action of the piston and cylinder assembly 20, 22 as the tong carrier 2 approaches the first position thereof.

At the bottom thereof, the cylinder 20 opens into a cylinder 58 of large diameter in which a piston 60 is slideable. The piston rod 26 passes centrally through the piston 60, the cylinder 58 and also through a recess 62 formed in the support 24. A downwards projection 59 of the piston 60 is a close fit in the recess 62. At the bottom of the recess 62, a sealing member 64 seals the gap between the piston rod 26 and the support 24 and also provides a guide for the piston rod 26 in its movement. An air passage 66 through the support 24 enters the recess 62 and communicates with the cylinder 20 through an annular passage through the piston 60 around the piston rod 26. Outside the recess 62, and air passage 68 formed in the support 24 enters the cylinder 58. This air passage 68 contains a restrictor 70.

The piston and cylinder assembly 58, 60 provides cushioning means of the mechanism operable to oppose the action of the piston and cylinder assembly 20, 22 as the tong carrier 2 approaches the second position thereof. This cushioning serves to reduce the impact between the articles of glassware, gripped by the tongs 4 carried by the tong carrier 2, and the dead plate of the machine. The piston and cylinder assembly 58, 60 operates pneumatically and, in the operation of the mechanism, air under pressure is continually supplied to the cylinder 58 through the air passage 68. This air urges the piston 60 upwardly in the cylinder 58, the upwards movement of the piston 60 being limited by a step 72 between the cylinders 20 and 58.

As the carrier 2 approaches its second position, in the operation of the mechanism, i.e. as the piston 22 reaches the bottom of the cylinder 20, the bottom of the piston 22 engages the top of the piston 60. The piston 22 pushes the piston 60 downwards in the cylinder 58, this movement being opposed by the air in the cylinder 58 which is forced out through the air passage 68 at a rate determined by the setting of the restrictor 70. Thus, the piston 60 is arranged to be moved in the cylinder 58 by the action of the piston and cylinder assembly 20, 22 as the tong carrier 2 approaches its second position. The movement of the piston 60 downwards in the cylinder 58 is opposed by the air under pressure in the cylinder 58. Since the air supplied to the air passage 68 is maintained at a constant pressure, a substantially constant air pressure is maintained in the cylinder 58, this constant pressure serving to oppose the movement of the piston 60 as aforesaid. When the piston 60 reaches the bottom of the cylinder 58 and comes to rest against the top of the support 24, the piston 22 is brought to rest and the carrier 2 is then in its second position. When the articles of glassware have been released on to the dead plate and the carrier 2 is to move back to its first position, the air supply to the air passage 46 is cut off. The air under pressure beneath the piston 60 is then operative to move the carrier 2 away from its second position by moving the piston 60 upwards in the cylinder 58 pushing the piston 22 until the piston 60 engages the step 72. This arrangement moves the tong carrier 2 away from the articles of glassware as rapidly as possible. Next, air under pressure is supplied to the passage 66 and passes through the annular passage around the piston rod 26 into the cylinder 20. The piston 22 is then raised away from the piston 60 and the carrier 2 returns to its first position.

It is found that the cushioning means of the mechanism shown in the drawings will function efficiently for long periods of time without requiring adjustment.

I claim:

1. A take-out mechanism for a glassware forming machine comprising a tong carrier movable in an arcuate path between a first position at which tongs supported by the carrier can grip an article of glassware and a second position at which the tongs can release the article onto a support, an arm on which the tong carrier is mounted, moving means operable to move the arm arcuately to move the tong carrier along the arcuate path, said moving means including a first piston and cylinder assembly, means defining a selectively activated air supply for said first piston and cylinder assembly to urge the first piston from a first position toward a second position in order to move the tong carrier towards its second position cushioning means comprising, a second piston and cylinder assembly opposing the action of said piston of the first piston and cylinder assembly as said tong carrier approaches its second position, means on the first piston to engage the second piston only when said first piston is at or near its second position, and means continuously supplying air pressure to said second piston and cylinder to urge said second piston in a direction opposite the direction of movement of said first piston as the tong carrier moves toward its second position, whereby, the second piston and cylinder assembly will cause the tong carrier to move away from its second position when the article has been released onto the support and the air supply to the first piston and cylinder assembly is inactive.

2. A take-out mechanism according to claim 1 characterized in that the first piston and cylinder assembly includes a piston rod extending centrally through the piston of the second piston and cylinder assembly.

3. The take-out mechanism according to claim 2 characterized in that the cylinder of the first piston and cylinder assembly includes an end cap which can be adjusted longitudinally of the cylinder to adjust the first position of the tong carrier.

4. A take-out mechanism according to claim 1, wherein the second piston includes a passage to permit air flow between said first and second cylinders, further including means defining an auxiliary air supply to said second cylinder to urge said first piston toward its first position when not engaged by said second piston.

* * * * *